United States Patent
Lipponen et al.

(10) Patent No.: US 6,631,158 B2
(45) Date of Patent: Oct. 7, 2003

(54) METHOD FOR UPDATING LINEAR FEEDBACK SHIFT REGISTER OF CODE GENERATOR

(75) Inventors: Veli Lipponen, Helsinki (FI); Pentti Moilanen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/903,867

(22) Filed: Jul. 13, 2001

(65) Prior Publication Data

US 2002/0031169 A1 Mar. 14, 2002

Related U.S. Application Data

(63) Continuation of application No. PCT/FI00/00236, filed on Mar. 22, 2000.

(30) Foreign Application Priority Data

Mar. 23, 1999 (FI) .................................................. 990649

(51) Int. Cl.⁷ .......................... H04L 27/30; A61H 2/06; H04B 7/216
(52) U.S. Cl. ...................... 375/150; 375/130; 375/152; 370/335
(58) Field of Search ............................... 375/130, 150, 375/152; 370/335

(56) References Cited

U.S. PATENT DOCUMENTS

| | | | | |
|---|---|---|---|---|
| 5,228,054 A | * | 7/1993 | Rueth et al. ................. 708/252 |
| 5,243,622 A | | 9/1993 | Lux et al. | |
| 5,267,271 A | * | 11/1993 | Rice ............................ 375/343 |
| 5,596,571 A | * | 1/1997 | Gould et al. ................. 370/335 |
| 5,761,239 A | | 6/1998 | Gold et al. | |
| 6,005,888 A | * | 12/1999 | Barron ........................ 375/208 |
| 6,014,408 A | | 1/2000 | Naruse et al. | |
| 6,061,338 A | * | 5/2000 | O ................................. 370/335 |
| 6,141,374 A | * | 10/2000 | Burns .......................... 375/152 |
| 6,246,697 B1 | * | 6/2001 | Whinnett et al. ............ 370/479 |
| 6,459,722 B2 | * | 10/2002 | Sriram et al. ................ 375/130 |
| 6,470,000 B1 | * | 10/2002 | Burns et al. ................. 370/342 |

FOREIGN PATENT DOCUMENTS

| | | |
|---|---|---|
| EP | 940 928 | 9/1999 |
| EP | 955 734 | 11/1999 |
| WO | WO 96/36137 | 11/1996 |
| WO | WO 99/35564 | 7/1999 |

OTHER PUBLICATIONS

Cruselles et al, Uncorrelated PN Sequences Generator for Speading Codes in CDMA Systems, IEEE 1995, pp. 296–298.*

Grant et al, Spread–Spectrum PN–Coded Waveform Detection For Communication ESM, IEEE, 1994, pp. 4/1–4/4.*

* cited by examiner

Primary Examiner—Mohammad H. Ghayour
Assistant Examiner—Tony Al-Beshrawi
(74) Attorney, Agent, or Firm—Pillsbury Winthrop LLP

(57) ABSTRACT

The invention relates to method and code generator for updating linear feedback shift register (LFSR). The method comprises defining jumps corresponding to different powers of two for shifting from known state to new state. Then in each jump the LFSR obtained as a result of the jump in question is generated: the value of one element of the obtained LFSR is generated from the previous state and the pre-stored mask register corresponding to said obtained element, while the mask register determines the elements of the LFSR of the previous state, using which elements said element value is generated, and the generation of the value of one LFSR element is repeated for each remaining obtained feedback LFSR by shifting the mask register to the position of said remaining element and by generating the value of said remaining element of the obtained LFSR from the previous state and the shifted mask register.

14 Claims, 14 Drawing Sheets

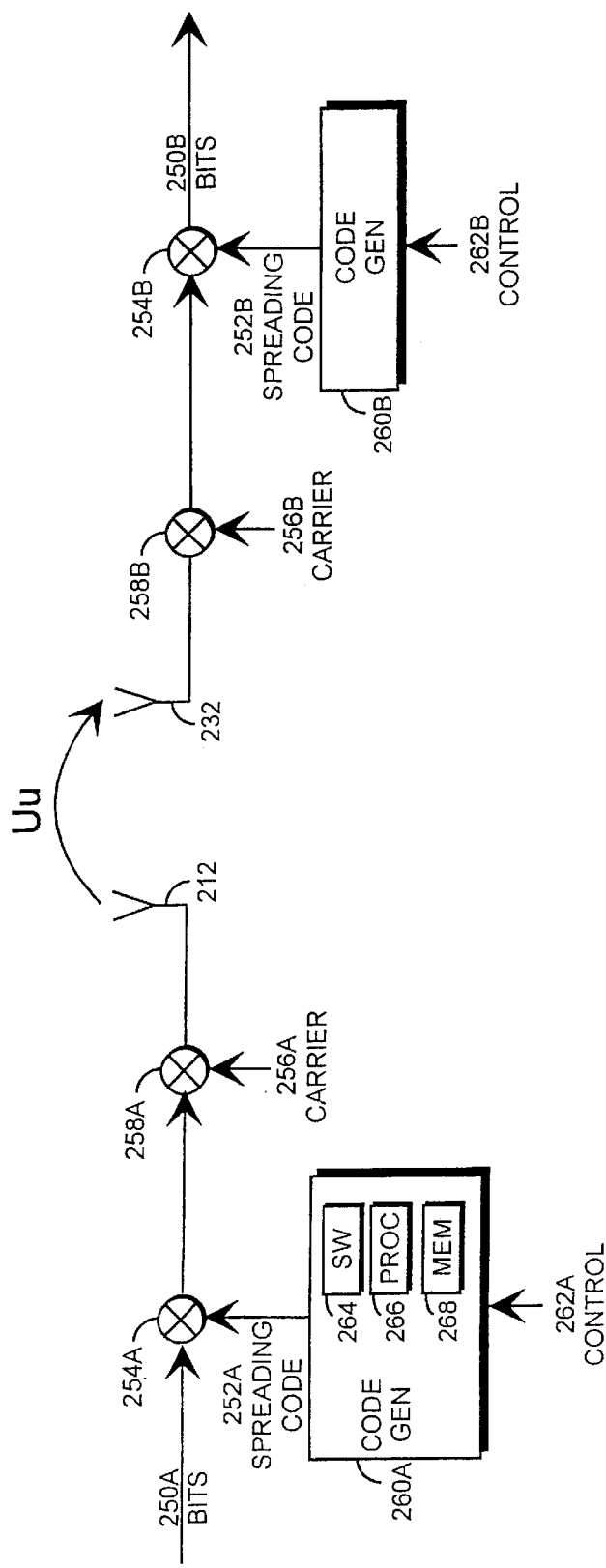
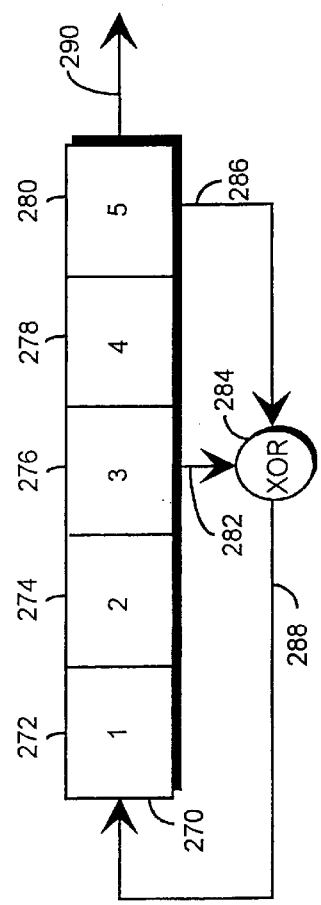
Fig 2B
Fig 2C

| TIME | LFSR → | | | | |
| --- | --- | --- | --- | --- | --- |
| | MSB | | | | LSB |
| | 1 | 2 | 3 | 4 | 5 |
| 0 | 1 | 1 | 1 | 1 | 1 |
| 1 | 0 | 1 | 1 | 1 | 1 |
| 2 | 0 | 0 | 1 | 1 | 1 |
| 3 | 0 | 0 | 0 | 1 | 1 |
| 4 | 1 | 0 | 0 | 0 | 1 |
| 5 | 1 | 1 | 0 | 0 | 0 |
| 6 | 0 | 1 | 1 | 0 | 0 |
| 7 | 1 | 0 | 1 | 1 | 0 |
| 8 | 1 | 1 | 0 | 1 | 1 |
| 9 | 1 | 1 | 1 | 0 | 1 |
| 10 | 0 | 1 | 1 | 1 | 0 |
| 11 | 1 | 0 | 1 | 1 | 1 |
| 12 | 0 | 1 | 0 | 1 | 1 |
| 13 | 1 | 0 | 1 | 0 | 1 |
| 14 | 0 | 1 | 0 | 1 | 0 |
| 15 | 0 | 0 | 1 | 0 | 1 |
| 16 | 0 | 0 | 0 | 1 | 0 |
| 17 | 0 | 0 | 0 | 0 | 1 |
| 18 | 1 | 0 | 0 | 0 | 0 |
| 19 | 0 | 1 | 0 | 0 | 0 |
| 20 | 0 | 0 | 1 | 0 | 0 |
| 21 | 1 | 0 | 0 | 1 | 0 |
| 22 | 0 | 1 | 0 | 0 | 1 |
| 23 | 1 | 0 | 1 | 0 | 0 |
| 24 | 1 | 1 | 0 | 1 | 0 |
| 25 | 0 | 1 | 1 | 0 | 1 |
| 26 | 0 | 0 | 1 | 1 | 0 |
| 27 | 1 | 0 | 0 | 1 | 1 |
| 28 | 1 | 1 | 0 | 0 | 1 |
| 29 | 1 | 1 | 1 | 0 | 0 |
| 30 | 1 | 1 | 1 | 1 | 0 |
| 31 | 1 | 1 | 1 | 1 | 1 |

Fig 4A

| JUMP | MASK FOR ELEMENT 5 | | | | | MASK AND 11111 | XOR |
|---|---|---|---|---|---|---|---|
| | 1 | 2 | 3 | 4 | 5 | | |
| 1  | 0 | 0 | 0 | 1 | 0 | 00010 | 1 |
| 2  | 0 | 0 | 1 | 0 | 0 | 00100 | 1 |
| 3  | 0 | 1 | 0 | 0 | 0 | 01000 | 1 |
| 4  | 1 | 0 | 0 | 0 | 0 | 10000 | 1 |
| 5  | 0 | 0 | 1 | 0 | 1 | 00101 | 0 |
| 6  | 0 | 1 | 0 | 1 | 0 | 01010 | 0 |
| 7  | 1 | 0 | 1 | 0 | 0 | 10100 | 0 |
| 8  | 0 | 1 | 1 | 0 | 1 | 01101 | 1 |
| 9  | 1 | 1 | 0 | 1 | 0 | 11010 | 1 |
| 10 | 1 | 0 | 0 | 0 | 1 | 10001 | 0 |
| 11 | 0 | 0 | 1 | 1 | 1 | 00111 | 1 |
| 12 | 0 | 1 | 1 | 1 | 0 | 01110 | 1 |
| 13 | 1 | 1 | 1 | 0 | 0 | 11100 | 1 |
| 14 | 1 | 1 | 1 | 0 | 1 | 11101 | 0 |
| 15 | 1 | 1 | 1 | 1 | 1 | 11111 | 1 |
| 16 | 1 | 1 | 0 | 1 | 1 | 11011 | 0 |
| 17 | 1 | 0 | 0 | 1 | 1 | 10011 | 1 |
| 18 | 0 | 0 | 0 | 1 | 1 | 00011 | 0 |
| 19 | 0 | 0 | 1 | 1 | 0 | 00110 | 0 |
| 20 | 0 | 1 | 1 | 0 | 0 | 01100 | 0 |
| 21 | 1 | 1 | 0 | 0 | 0 | 11000 | 0 |
| 22 | 1 | 0 | 1 | 0 | 1 | 10101 | 1 |
| 23 | 0 | 1 | 1 | 1 | 1 | 01111 | 0 |
| 24 | 1 | 1 | 1 | 1 | 0 | 11110 | 0 |
| 25 | 1 | 1 | 0 | 0 | 1 | 11001 | 1 |
| 26 | 1 | 0 | 1 | 1 | 1 | 10111 | 0 |
| 27 | 0 | 1 | 0 | 1 | 1 | 01011 | 1 |
| 28 | 1 | 0 | 1 | 1 | 0 | 10110 | 1 |
| 29 | 0 | 1 | 0 | 0 | 1 | 01001 | 0 |
| 30 | 1 | 0 | 0 | 1 | 0 | 10010 | 0 |
| 31 | 0 | 0 | 0 | 0 | 1 | 00001 | 1 |

Fig 4B

PRIOR ART

| JUMP | MASK FOR ELEMENT 4 | | | | | MASK AND | XOR |
|---|---|---|---|---|---|---|---|
| | 1 | 2 | 3 | 4 | 5 | 11111 | |
| 1 | 0 | 0 | 1 | 0 | 0 | 00100 | 1 |
| 2 | 0 | 1 | 0 | 0 | 0 | 01000 | 1 |
| 3 | 1 | 0 | 0 | 0 | 0 | 10000 | 1 |
| 4 | 0 | 0 | 1 | 0 | 1 | 00101 | 0 |
| 5 | 0 | 1 | 0 | 1 | 0 | 01010 | 0 |
| 6 | 1 | 0 | 1 | 0 | 0 | 10100 | 0 |
| 7 | 0 | 1 | 1 | 0 | 1 | 01101 | 1 |
| 8 | 1 | 1 | 0 | 1 | 0 | 11010 | 1 |
| 9 | 1 | 0 | 0 | 0 | 1 | 10001 | 0 |
| 10 | 0 | 0 | 1 | 1 | 1 | 00111 | 1 |
| 11 | 0 | 1 | 1 | 1 | 0 | 01110 | 1 |
| 12 | 1 | 1 | 1 | 0 | 0 | 11100 | 1 |
| 13 | 1 | 1 | 1 | 0 | 1 | 11101 | 0 |
| 14 | 1 | 1 | 1 | 1 | 1 | 11111 | 1 |
| 15 | 1 | 1 | 0 | 1 | 1 | 11011 | 0 |
| 16 | 1 | 0 | 0 | 1 | 1 | 10011 | 1 |
| 17 | 0 | 0 | 0 | 1 | 1 | 00011 | 0 |
| 18 | 0 | 0 | 1 | 1 | 0 | 00110 | 0 |
| 19 | 0 | 1 | 1 | 0 | 0 | 01100 | 0 |
| 20 | 1 | 1 | 0 | 0 | 0 | 11000 | 0 |
| 21 | 1 | 0 | 1 | 0 | 1 | 10101 | 1 |
| 22 | 0 | 1 | 1 | 1 | 1 | 01111 | 0 |
| 23 | 1 | 1 | 1 | 1 | 0 | 11110 | 0 |
| 24 | 1 | 1 | 0 | 0 | 1 | 11001 | 1 |
| 25 | 1 | 0 | 1 | 1 | 1 | 10111 | 0 |
| 26 | 0 | 1 | 0 | 1 | 1 | 01011 | 1 |
| 27 | 1 | 0 | 1 | 1 | 0 | 10110 | 1 |
| 28 | 0 | 1 | 0 | 0 | 1 | 01001 | 0 |
| 29 | 1 | 0 | 0 | 1 | 0 | 10010 | 0 |
| 30 | 0 | 0 | 0 | 0 | 1 | 00001 | 1 |
| 31 | 0 | 0 | 0 | 1 | 0 | 00010 | 1 |

Fig 4C

PRIOR ART

| JUMP | MASK FOR ELEMENT 3 | | | | | MASK AND 11111 | XOR |
|---|---|---|---|---|---|---|---|
| | 1 | 2 | 3 | 4 | 5 | | |
| 1 | 0 | 1 | 0 | 0 | 0 | 01000 | 1 |
| 2 | 1 | 0 | 0 | 0 | 0 | 10000 | 1 |
| 3 | 0 | 0 | 1 | 0 | 1 | 00101 | 0 |
| 4 | 0 | 1 | 0 | 1 | 0 | 01010 | 0 |
| 5 | 1 | 0 | 1 | 0 | 0 | 10100 | 0 |
| 6 | 0 | 1 | 1 | 0 | 1 | 01101 | 1 |
| 7 | 1 | 1 | 0 | 1 | 0 | 11010 | 1 |
| 8 | 1 | 0 | 0 | 0 | 1 | 10001 | 0 |
| 9 | 0 | 0 | 1 | 1 | 1 | 00111 | 1 |
| 10 | 0 | 1 | 1 | 1 | 0 | 01110 | 1 |
| 11 | 1 | 1 | 1 | 0 | 0 | 11100 | 1 |
| 12 | 1 | 1 | 1 | 0 | 1 | 11101 | 0 |
| 13 | 1 | 1 | 1 | 1 | 1 | 11111 | 1 |
| 14 | 1 | 1 | 0 | 1 | 1 | 11011 | 0 |
| 15 | 1 | 0 | 0 | 1 | 1 | 10011 | 1 |
| 16 | 0 | 0 | 0 | 1 | 1 | 00011 | 0 |
| 17 | 0 | 0 | 1 | 1 | 0 | 00110 | 0 |
| 18 | 0 | 1 | 1 | 0 | 0 | 01100 | 0 |
| 19 | 1 | 1 | 0 | 0 | 0 | 11000 | 0 |
| 20 | 1 | 0 | 1 | 0 | 1 | 10101 | 1 |
| 21 | 0 | 1 | 1 | 1 | 1 | 01111 | 0 |
| 22 | 1 | 1 | 1 | 1 | 0 | 11110 | 0 |
| 23 | 1 | 1 | 0 | 0 | 1 | 11001 | 1 |
| 24 | 1 | 0 | 1 | 1 | 1 | 10111 | 0 |
| 25 | 0 | 1 | 0 | 1 | 1 | 01011 | 1 |
| 26 | 1 | 0 | 1 | 1 | 0 | 10110 | 1 |
| 27 | 0 | 1 | 0 | 0 | 1 | 01001 | 0 |
| 28 | 1 | 0 | 0 | 1 | 0 | 10010 | 0 |
| 29 | 0 | 0 | 0 | 0 | 1 | 00001 | 1 |
| 30 | 0 | 0 | 0 | 1 | 0 | 00010 | 1 |
| 31 | 0 | 0 | 1 | 0 | 0 | 00100 | 1 |

Fig 4D

PRIOR ART

| JUMP | MASK FOR ELEMENT 2 | | | | | MASK AND 11111 | XOR |
|---|---|---|---|---|---|---|---|
| | 1 | 2 | 3 | 4 | 5 | | |
| 1  | 1 | 0 | 0 | 0 | 0 | 10000 | 1 |
| 2  | 0 | 0 | 1 | 0 | 1 | 00101 | 0 |
| 3  | 0 | 1 | 0 | 1 | 0 | 01010 | 0 |
| 4  | 1 | 0 | 1 | 0 | 0 | 10100 | 0 |
| 5  | 0 | 1 | 1 | 0 | 1 | 01101 | 1 |
| 6  | 1 | 1 | 0 | 1 | 0 | 11010 | 1 |
| 7  | 1 | 0 | 0 | 0 | 1 | 10001 | 0 |
| 8  | 0 | 0 | 1 | 1 | 1 | 00111 | 1 |
| 9  | 0 | 1 | 1 | 1 | 0 | 01110 | 1 |
| 10 | 1 | 1 | 1 | 0 | 0 | 11100 | 1 |
| 11 | 1 | 1 | 1 | 0 | 1 | 11101 | 0 |
| 12 | 1 | 1 | 1 | 1 | 1 | 11111 | 1 |
| 13 | 1 | 1 | 0 | 1 | 1 | 11011 | 0 |
| 14 | 1 | 0 | 0 | 1 | 1 | 10011 | 1 |
| 15 | 0 | 0 | 0 | 1 | 1 | 00011 | 0 |
| 16 | 0 | 0 | 1 | 1 | 0 | 00110 | 0 |
| 17 | 0 | 1 | 1 | 0 | 0 | 01100 | 0 |
| 18 | 1 | 1 | 0 | 0 | 0 | 11000 | 0 |
| 19 | 1 | 0 | 1 | 0 | 1 | 10101 | 1 |
| 20 | 0 | 1 | 1 | 1 | 1 | 01111 | 0 |
| 21 | 1 | 1 | 1 | 1 | 0 | 11110 | 0 |
| 22 | 1 | 1 | 0 | 0 | 1 | 11001 | 1 |
| 23 | 1 | 0 | 1 | 1 | 1 | 10111 | 0 |
| 24 | 0 | 1 | 0 | 1 | 1 | 01011 | 1 |
| 25 | 1 | 0 | 1 | 1 | 0 | 10110 | 1 |
| 26 | 0 | 1 | 0 | 0 | 1 | 01001 | 0 |
| 27 | 1 | 0 | 0 | 1 | 0 | 10010 | 0 |
| 28 | 0 | 0 | 0 | 0 | 1 | 00001 | 1 |
| 29 | 0 | 0 | 0 | 1 | 0 | 00010 | 1 |
| 30 | 0 | 0 | 1 | 0 | 0 | 00100 | 1 |
| 31 | 0 | 1 | 0 | 0 | 0 | 01000 | 1 |

Fig 4E

PRIOR ART

| JUMP | MASK FOR ELEMENT 1 | | | | | MASK AND 11111 | XOR |
|---|---|---|---|---|---|---|---|
| | 1 | 2 | 3 | 4 | 5 | | |
| 1 | 0 | 0 | 1 | 0 | 1 | 00101 | 0 |
| 2 | 0 | 1 | 0 | 1 | 0 | 01010 | 0 |
| 3 | 1 | 0 | 1 | 0 | 0 | 10100 | 0 |
| 4 | 0 | 1 | 1 | 0 | 1 | 01101 | 1 |
| 5 | 1 | 1 | 0 | 1 | 0 | 11010 | 1 |
| 6 | 1 | 0 | 0 | 0 | 1 | 10001 | 0 |
| 7 | 0 | 0 | 1 | 1 | 1 | 00111 | 1 |
| 8 | 0 | 1 | 1 | 1 | 0 | 01110 | 1 |
| 9 | 1 | 1 | 1 | 0 | 0 | 11100 | 1 |
| 10 | 1 | 1 | 1 | 0 | 1 | 11101 | 0 |
| 11 | 1 | 1 | 1 | 1 | 1 | 11111 | 1 |
| 12 | 1 | 1 | 0 | 1 | 1 | 11011 | 0 |
| 13 | 1 | 0 | 0 | 1 | 1 | 10011 | 1 |
| 14 | 0 | 0 | 0 | 1 | 1 | 00011 | 0 |
| 15 | 0 | 0 | 1 | 1 | 0 | 00110 | 0 |
| 16 | 0 | 1 | 1 | 0 | 0 | 01100 | 0 |
| 17 | 1 | 1 | 0 | 0 | 0 | 11000 | 0 |
| 18 | 1 | 0 | 1 | 0 | 1 | 10101 | 1 |
| 19 | 0 | 1 | 1 | 1 | 1 | 01111 | 0 |
| 20 | 1 | 1 | 1 | 1 | 0 | 11110 | 0 |
| 21 | 1 | 1 | 0 | 0 | 1 | 11001 | 1 |
| 22 | 1 | 0 | 1 | 1 | 1 | 10111 | 0 |
| 23 | 0 | 1 | 0 | 1 | 1 | 01011 | 1 |
| 24 | 1 | 0 | 1 | 1 | 0 | 10110 | 1 |
| 25 | 0 | 1 | 0 | 0 | 1 | 01001 | 0 |
| 26 | 1 | 0 | 0 | 1 | 0 | 10010 | 0 |
| 27 | 0 | 0 | 0 | 0 | 1 | 00001 | 1 |
| 28 | 0 | 0 | 0 | 1 | 0 | 00010 | 1 |
| 29 | 0 | 0 | 1 | 0 | 0 | 00100 | 1 |
| 30 | 0 | 1 | 0 | 0 | 0 | 01000 | 1 |
| 31 | 1 | 0 | 0 | 0 | 0 | 10000 | 1 |

Fig 4F

PRIOR ART

| JUMP | MASK FOR ELEMENT 5 | | | | |
|---|---|---|---|---|---|
| | 1 | 2 | 3 | 4 | 5 |
| 1=2EXP0 | 0 | 0 | 0 | 1 | 0 |
| 2=2EXP1 | 0 | 0 | 1 | 0 | 0 |
| 4=2EXP2 | 1 | 0 | 0 | 0 | 0 |
| 8=2EXP3 | 0 | 1 | 1 | 0 | 1 |
| 16=2EXP4 | 1 | 1 | 0 | 1 | 1 |

| JUMP | MASK FOR ELEMENT 4 | | | | |
|---|---|---|---|---|---|
| | 1 | 2 | 3 | 4 | 5 |
| 1 | 0 | 0 | 1 | 0 | 0 |
| 2 | 0 | 1 | 0 | 0 | 0 |
| 4 | 0 | 0 | 1 | 0 | 1 |
| 8 | 1 | 1 | 0 | 1 | 0 |
| 16 | 1 | 0 | 0 | 1 | 1 |

| JUMP | MASK FOR ELEMENT 3 | | | | |
|---|---|---|---|---|---|
| | 1 | 2 | 3 | 4 | 5 |
| 1 | 0 | 1 | 0 | 0 | 0 |
| 2 | 1 | 0 | 0 | 0 | 0 |
| 4 | 0 | 1 | 0 | 1 | 0 |
| 8 | 1 | 0 | 0 | 0 | 1 |
| 16 | 0 | 0 | 0 | 1 | 1 |

| JUMP | MASK FOR ELEMENT 2 | | | | |
|---|---|---|---|---|---|
| | 1 | 2 | 3 | 4 | 5 |
| 1 | 1 | 0 | 0 | 0 | 0 |
| 2 | 0 | 0 | 1 | 0 | 1 |
| 4 | 1 | 0 | 1 | 0 | 0 |
| 8 | 0 | 0 | 1 | 1 | 1 |
| 16 | 0 | 0 | 1 | 1 | 0 |

| JUMP | MASK FOR ELEMENT 1 | | | | |
|---|---|---|---|---|---|
| | 1 | 2 | 3 | 4 | 5 |
| 1 | 0 | 0 | 1 | 0 | 1 |
| 2 | 0 | 1 | 0 | 1 | 0 |
| 4 | 0 | 1 | 1 | 0 | 1 |
| 8 | 0 | 1 | 1 | 1 | 0 |
| 16 | 0 | 1 | 1 | 0 | 0 |

Fig 4G

|  | ELEMENT | | | | |
|---|---|---|---|---|---|
|  | 1 | 2 | 3 | 4 | 5 |
| REFERENCE | 1 | 1 | 1 | 1 | 1 |
| JUMP 16 MASK FOR EL 5 | 1 | 1 | 0 | 1 | 1 |
| REFERENCE AND PREVIOUS | 1 | 1 | 0 | 1 | 1 | → XOR=0
| JUMP 16 MASK FOR EL 4 | 1 | 0 | 0 | 1 | 1 |
| REFERENCE AND PREVIOUS | 1 | 0 | 0 | 1 | 1 | → XOR=1
| JUMP 16 MASK FOR EL 3 | 0 | 0 | 0 | 1 | 1 |
| REFERENCE AND PREVIOUS | 0 | 0 | 0 | 1 | 1 | → XOR=0
| JUMP 16 MASK FOR EL 2 | 0 | 0 | 1 | 1 | 0 |
| REFERENCE AND PREVIOUS | 0 | 0 | 1 | 1 | 0 | → XOR=0
| JUMP 16 MASK FOR EL 1 | 0 | 1 | 1 | 0 | 0 |
| REFERENCE AND PREVIOUS | 0 | 1 | 1 | 0 | 0 | → XOR=0
| AT TIME=16 | 0 | 0 | 0 | 1 | 0 |

Fig 4H

|  | ELEMENT | | | | |
|---|---|---|---|---|---|
|  | 1 | 2 | 3 | 4 | 5 |
| REFERENCE | 1 | 1 | 1 | 1 | 1 |
| JUMP 4 MASK FOR EL 5 | 1 | 0 | 0 | 0 | 0 |
| REFERENCE AND PREVIOUS | 1 | 0 | 0 | 0 | 0 | → XOR=1
| JUMP 4 MASK FOR EL 4 | 0 | 0 | 1 | 0 | 1 |
| REFERENCE AND PREVIOUS | 0 | 0 | 1 | 0 | 1 | → XOR=0
| JUMP 4 MASK FOR EL 3 | 0 | 1 | 0 | 1 | 0 |
| REFERENCE AND PREVIOUS | 0 | 1 | 0 | 1 | 0 | → XOR=0
| JUMP 4 MASK FOR EL 2 | 1 | 0 | 1 | 0 | 0 |
| REFERENCE AND PREVIOUS | 1 | 0 | 1 | 0 | 0 | → XOR=0
| JUMP 4 MASK FOR EL 1 | 0 | 1 | 1 | 0 | 1 |
| REFERENCE AND PREVIOUS | 0 | 1 | 1 | 0 | 1 | → XOR=1
| AT TIME=4 | 1 | 0 | 0 | 0 | 1 |
| JUMP 8 MASK FOR EL 5 | 0 | 1 | 1 | 0 | 1 |
| AT TIME=4 AND PREVIOUS | 0 | 0 | 0 | 0 | 1 | → XOR=1
| JUMP 8 MASK FOR EL 4 | 1 | 1 | 0 | 1 | 0 |
| AT TIME=4 AND PREVIOUS | 1 | 0 | 0 | 0 | 0 | → XOR=1
| JUMP 8 MASK FOR EL 3 | 1 | 0 | 0 | 0 | 1 |
| AT TIME=4 AND PREVIOUS | 1 | 0 | 0 | 0 | 1 | → XOR=0
| JUMP 8 MASK FOR EL 2 | 0 | 0 | 1 | 1 | 1 |
| AT TIME=4 AND PREVIOUS | 0 | 0 | 0 | 0 | 1 | → XOR=1
| JUMP 8 MASK FOR EL 1 | 0 | 1 | 1 | 1 | 0 |
| AT TIME=4 AND PREVIOUS | 0 | 0 | 0 | 0 | 0 | → XOR=0
| AT TIME=4+8=12 | 0 | 1 | 0 | 1 | 1 |

Fig 4I

METHOD FOR UPDATING LINEAR FEEDBACK SHIFT REGISTER OF CODE GENERATOR

This application is a Continuation of International Application PCT/FI00/00236 filed on Mar. 22, 2000 which designated the U.S. and was published under PCT Article 21(2) in English.

FIELD OF INVENTION

The invention relates to a method for updating a linear feedback shift register of a code generator from a known state to a new state, and to a code generator using the method. 'Code' refers to a pseudo-noise sequence used in a radio system, for instance to a long spreading code or scrambling code in a radio system employing code division multiple access (CDMA).

BACKGROUND

In radio systems employing code division multiple access, the radio resource is divided on a code-division basis between the various users. The payload of each user is spread onto a wide frequency band, of five megahertz, for instance, by multiplying the payload with a spreading code. A receiver distinguishes the signal it wants by multiplying the received signal by the spreading code used to spread it. Parts of a spreading code are called chips which are, in fact, bits. The value of a chip can be marked by a zero and a one, or in real numbers by a one and a minus one. The chip rate is typically significantly faster, over a hundred times faster, for instance, than the payload rate.

In addition to spreading codes, codes known as scrambling codes can also be used. The scrambling codes do not necessarily spread the signal any more, but scramble the bits of a spread signal by multiplying each bit in the signal with the corresponding scrambling code bit. Scrambling codes can be extremely long, $2^{41}-1$ chips long, for instance.

The spreading codes used are usually as orthogonal as possible with respect to each other. Spreading codes are obtained from a Hadamard matrix, for instance. A Hadamard matrix $M_n$ is an n×n matrix (n is an even integer) made of zeros and ones so that any matrix line differs from any other matrix line exactly at an n/2 position. One matrix line thus contains only zeros, whereas the rest of the lines contain an equal number of zeros and ones. When n=2, the following Hadamard matrix is obtained:

$$M_2 = \begin{bmatrix} 0 & 0 \\ 0 & 1 \end{bmatrix} \quad (1)$$

From the Hadamard matrix $M_n$, the Hadamard matrix $M_{2n}$ is generated by the following relation:

$$M_{2n} = \begin{bmatrix} M_n & M_n \\ M_n & \overline{M_n} \end{bmatrix} \quad (2)$$

where matrix $\overline{M_n}$ is a complement of matrix $M_n$, i.e. the zeros have been replaced with ones and the ones with zeros. Thus, matrix 1 provides:

$$M_4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \quad (3)$$

Further, maxtrix 3 provides:

$$M_8 = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix} \quad (4)$$

If the elements, that is, zeros and ones, of the above Hadamard matrices are represented by ones and minus ones, then the lines in the Hadamard matrix are orthogonal with respect to each other. If desired, the values could also be inverted, i.e. the zeros changed to ones and the ones to zeros, but this does not change the properties of the matrix. For instance, matrix 1 could also be presented as:

$$M_2 = \begin{bmatrix} 1 & 1 \\ 1 & 0 \end{bmatrix}, \quad M_2 = \begin{bmatrix} 1 & 1 \\ 1 & -1 \end{bmatrix}$$

Each matrix line forms one spreading code. The length of a spreading code varies according to the desired spreading factor. Spreading codes can be numbered, for instance, by indicating the code class of the spreading code and its ordinal number in said code class. The code class can be obtained by the following equation: two to the power of the code class equals the length of the spreading code, i.e. the code class is a binary logarithm of the spreading code. Thus, matrix 4, for instance, has the following spreading codes (subindex denotes the code class and the ordinal number is in brackets):

SPREADINGCODE$_3$(0)={0,0,0,0,0,0,0,0}
SPREADINGCODE$_3$(1)={0,1,0,1,0,1,0,1}
SPREADINGCODE$_3$(2)={0,0,1,1,0,0,1,1}
SPREADINGCODE$_3$(3)={0,1,1,0,0,1,1,0}
SPREADINGCODE$_3$(4)={0,0,0,0,1,1,1,1}
SPREADINGCODE$_3$(5)={0,1,0,1,1,0,1,0}
SPREADINGCODE$_3$(6)={0,0,1,1,1,1,0,0}
SPREADINGCODE$_3$(7)={0,1,1,0,1,0,0,1}

According to prior art, all short spreading codes are stored into the memory of a transceiver. This means that for a code class 8 code, for instance, 256 different 256-chip-long codes are stored into the memory, i.e. the memory requirement is 256×256 bits, which totals 65536 bits. Shorter spreading codes can be generated from the stored long codes, which means that the spreading codes of lower code classes need not be separately stored.

Spreading codes can be extremely long, $2^{21}-1$ chips long, for instance. This creates the technical problem of being able to generate said code in real-time, since the same sequence is typically used, but different transmitters use it at different stages. Ideally, the generated code sequence would be completely random, but this is not practical, because both the transmitter and the receiver must be able to generate the code sequence used and with the same timing, i.e. phase, too.

Code is generated with a code generator, with a code generator using a linear feedback shift register, for instance. Publication WO 96/36137 discloses a linear feedback shift register that is used for generating an m-sequence (maximal length sequence) to provide a pseudo-noise sequence to be used as a code, the sequence being iterated after $2^N-1$ cycles, where N represents the number of elements in the feedback shift register. The initial state is always known in linear feedback shift registers, but a problem arises from how to jump from the initial state to an unknown new state. In the solution disclosed in said publication, a transformation matrix corresponding to each jump, or at least to each jump corresponding to a power of two, is stored, which transformation matrix indicates how each element of the initial state should be transformed to obtain the elements of the new state. Thus, for instance, for a spreading code of $2^{41}-1$ chips, 41×41×41 (the number of the powers of two×the number of the elements in the feedback shift register×the length of the feedback shift register) bits are stored, i.e. a total of 68921 bits.

BRIEF DESCRIPTION

It is an object of the invention to develop a method for generating a spreading code when necessary, whereby memory is not needed for storing each spreading code, and saving memory space in comparison with known methods. This object is achieved by the method disclosed in the following. The method in question is a method for updating the linear feedback shift register of a code generator from a known state to a new state, comprising defining the jumps corresponding to the different powers of two for shifting from a known state to a new state. The method also comprises generating in each jump the feedback shift register obtained as a result of said jump as follows: generating the value of one element of the obtained feedback shift register from the previous state and the pre-stored mask register corresponding to said element, while the mask register determines the elements of the feedback shift register of the previous state, using which elements said element value is generated, and repeating the generation of the value of one feedback shift register element for each remaining obtained feedback shift register element by shifting the mask register to the position of said remaining element and by generating the value of said remaining element of the obtained feedback shift register from the previous state and the shifted mask register.

The invention also relates to a code generator of a radio system, comprising means for defining the jumps corresponding to the different powers of two for updating the linear feedback shift register of a code generator from a known state to a new state. The code generator also comprising: means for generating in each jump the feedback shift register obtained as a result of said jump, comprising means for generating the value of one element of the obtained feedback shift register from the previous state and the pre-stored mask register corresponding to said obtained element, while the mask register determines the elements of the feedback shift register of the previous state, using which elements said obtained element value is generated; means for repeating the generation of the value of one feedback shift register element for each remaining obtained feedback shift register element by shifting the mask register to the position of said remaining element and by generating the value of said remaining element of the obtained feedback shift register from the previous state and the shifted mask register.

Preferred embodiments of the invention are set forth in the dependent claims.

The invention is based on the idea that spreading codes are not stored, but generated when necessary using the powerful calculation method disclosed hereafter. In the calculation method, only the mask register of one element of each power of two is most preferably stored. The rest of the mask registers are generated from the stored mask register. The invention provides a significant memory saving, because it is not necessary to store a mask register for each element of a feedback shift register, i.e. for a spreading code of $2^{41}-1$ chips, for instance, only 41×41 bits (the number of the different powers of two × the length of the feedback shift register), totalling 1681 bits, are stored, which constitutes only 1/41 of the 68921 bits needed in the prior art mentioned above.

BRIEF DESCRIPTION OF DRAWING

In the following, the invention will be described in greater detail by means of preferred embodiments and with reference to the attached drawings, in which FIG. 2C shows an example of a simple linear feedback shift register, FIGS. 4A and 4I illustrate the operating principle of the updating method;

FIGS. 4B–4F illustrate the operation of prior Art method.

DETAILED DESCRIPTION OF EMBODIMENTS

The invention can be used in various mobile telephone systems employing linear feedback shift registers for the generation of various codes, such as mobile telephone systems employing code division multiple access. The examples describe the use of the invention in a universal mobile telephone system (UMTS), without limiting the invention thereto, however.

The structure of the universal mobile telephone system is described with reference to FIGS. 1A and 1B. FIG. 1B contains only the blocks that are essential for describing the invention, but it is obvious to a person skilled in the art that a conventional mobile telephone system also contains other functions and elements which need not be described in detail herein. The main parts of a mobile telephone system are a core network CN, a universal mobile telephone system (UMTS) terrestrial radio access network UTRAN, and user equipment UE. The interface between CN and UTRAN is referred to as Iu and the air interface between UTRAN and UE is referred to as Uu.

UTRAN comprises radio network subsystems RNS. The interface between RNSs is referred to as Iur. An RNS comprises a radio network controller RNC and one or more nodes B. The interface between RNC and B is referred to as Iub. The service area of node B, i.e. cell, is indicated with C in FIG. 1B.

Figure 1A:
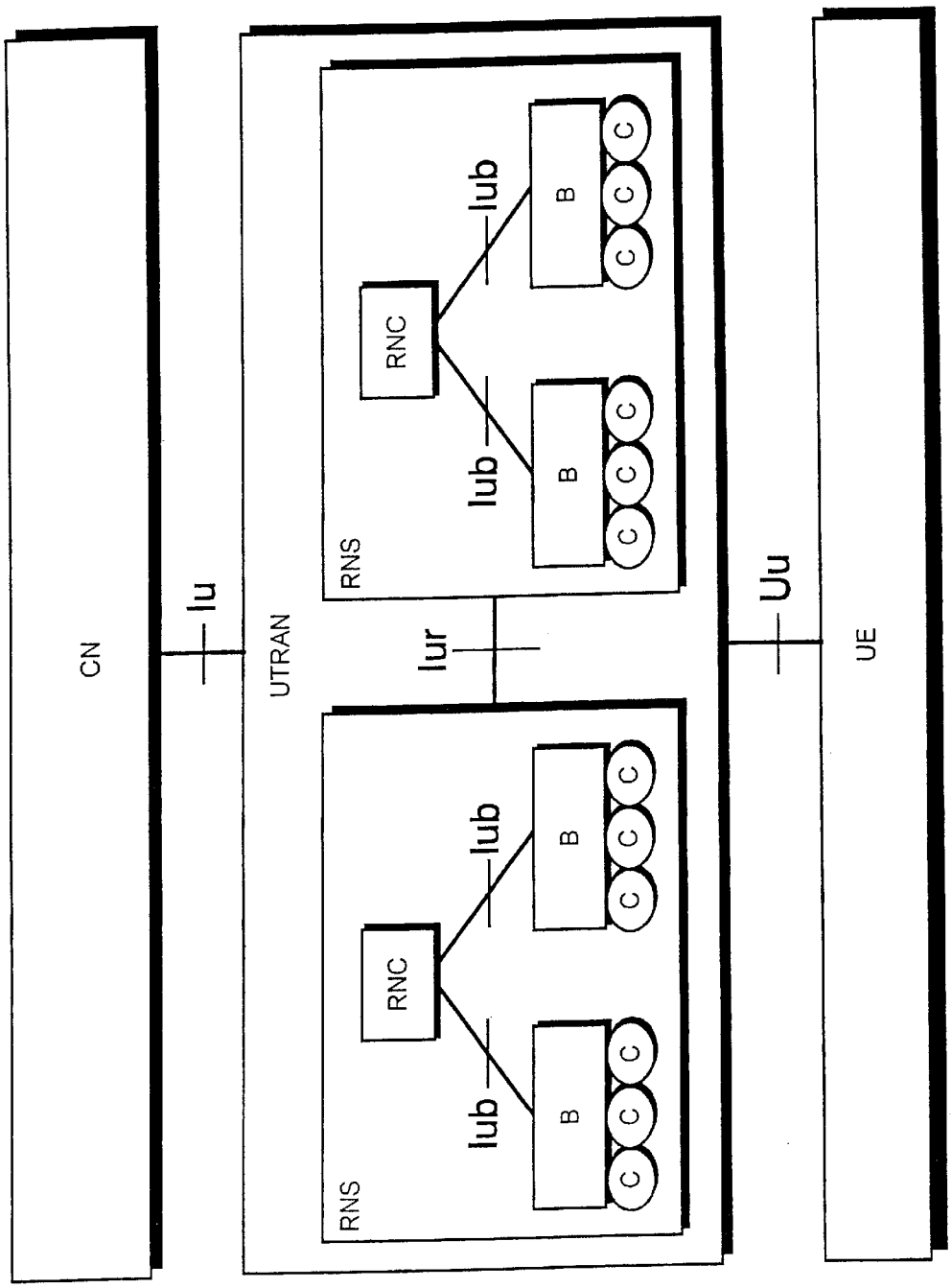
FIGS. 1A and 1B show an example of a mobile telephone system.
Figure 1B:
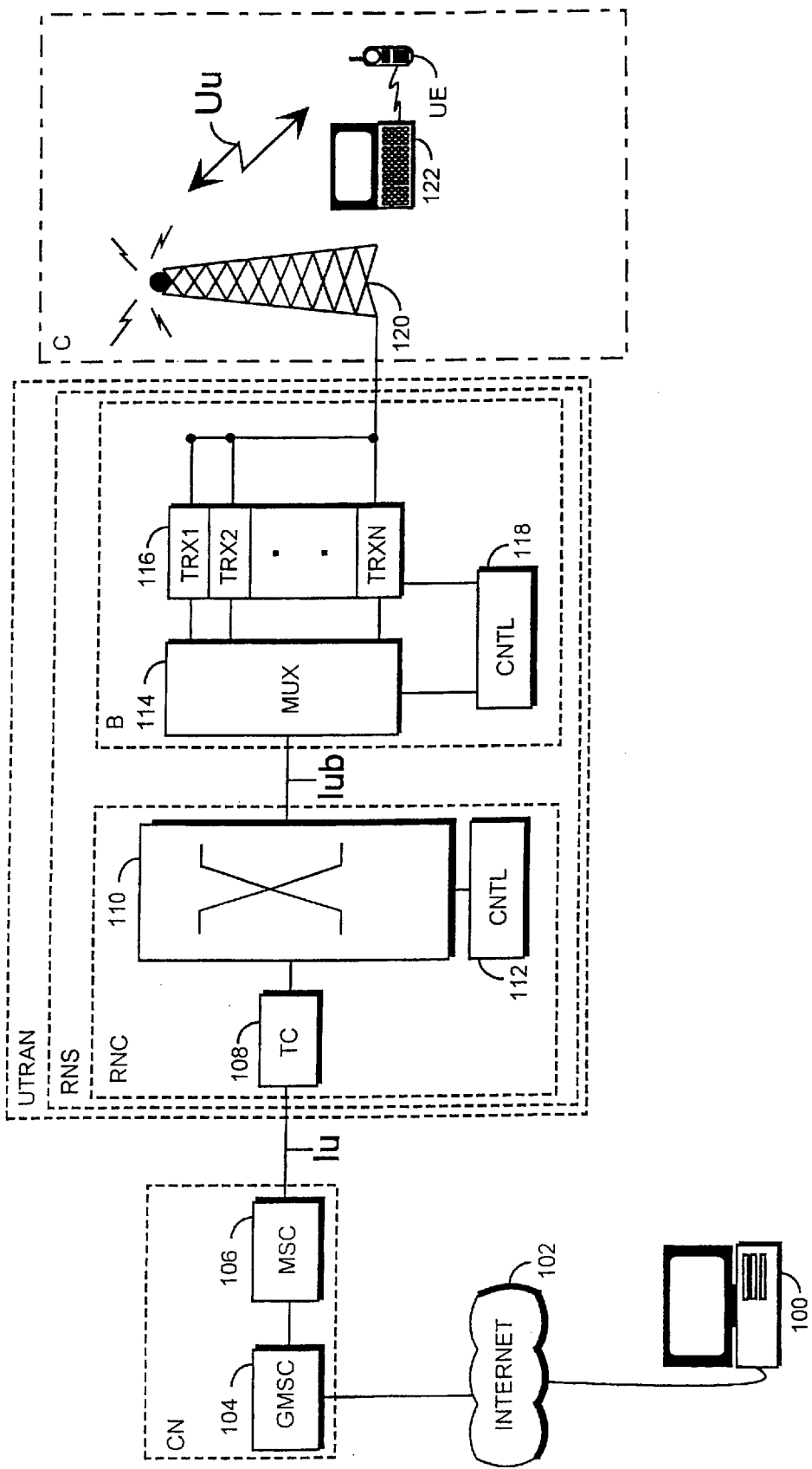

As the presentation in FIG. 1A is very abstract, it is clarified in FIG. 1B by setting forth the parts of the GSM system that approximately correspond to the parts of the UMTS. It should be noted that the mapping shown is by no means a binding one but an approximation, since the responsibilities and functions of the different parts of the UMTS are still being planned.

FIG. 1B shows a packet transfer through the Internet 102 from a computer 100 connected to a mobile telephone system to a portable computer 122 connected to user equipment UE. The user equipment UE can, for instance, be a fixed terminal, a terminal arranged in a vehicle, or a portable terminal. The infrastructure of a radio network UTRAN comprises radio network subsystems RNS, i.e. base transceiver station systems. A radio network subsystem RNS comprises a radio network controller RNC, i.e. base station controller, and at least one node B, i.e. base transceiver station, under its control.

The node B has a multiplexer 114, transceivers 116 and a control unit 118 which controls the operation of the transceivers 116 and the multiplexer 114. With the multiplexer 114, the traffic and control channels used by several transceivers 116 are placed in the transmission link Iub.

The transceivers 116 of the node B are connected to an antenna unit 120 with which a bi-directional radio link Uu is implemented to user equipment UE. The structure of the frames to be transmitted over the bi-directional radio link Uu is clearly specified.

The radio network controller RNC comprises a group switching field 110 and a control unit 112. The group switching field 110 is used for speech and data connection and to connect signalling circuits. The base station system formed by the node B and the radio network controller RNC also comprises a transcoder 108. Work distribution between the radio network controller RNC and the node B as well as their physical structure can vary depending on implementation. Typically, the node B takes care of the radio path implementation as described above. The radio network controller RNC typically takes care of the following: management of radio resources, control of handover between cells, power adjustment, timing and synchronization, paging the user equipment.

The transcoder 108 is usually located as close as possible to a mobile switching centre 106, because speech can then be transmitted in mobile telephone system format between the transcoder 108 and the radio network controller RNC saving transmission capacity. The transcoder 108 converts the different digital coding formats of speech used between the public switched telephone network and the mobile telephone network to be compatible with each other, for instance from the 64 kbit/s format of a public network to another (e.g. 13 kbit/s) format of a cellular network and vice versa. The hardware required is not described in detail herein, but it can be noted that other data than speech is not converted in a transcoder 122. A control unit 112 takes care of call control, mobility management, collection of statistics, and signalling.

The core network CN comprises an infrastructure belonging to a mobile telephone system and external to UTRAN. FIG. 1B describes two of the components in a core network CN, i.e. a mobile switching centre 106 and a gateway mobile switching centre 104 which handles the connections of the mobile telephone system to the outside world, in this case, to the Internet 102.

User equipment can be a mobile phone, a car phone, a terminal of a wireless local loop or data transmission equipment integrated to a computer.

Figure 2A:
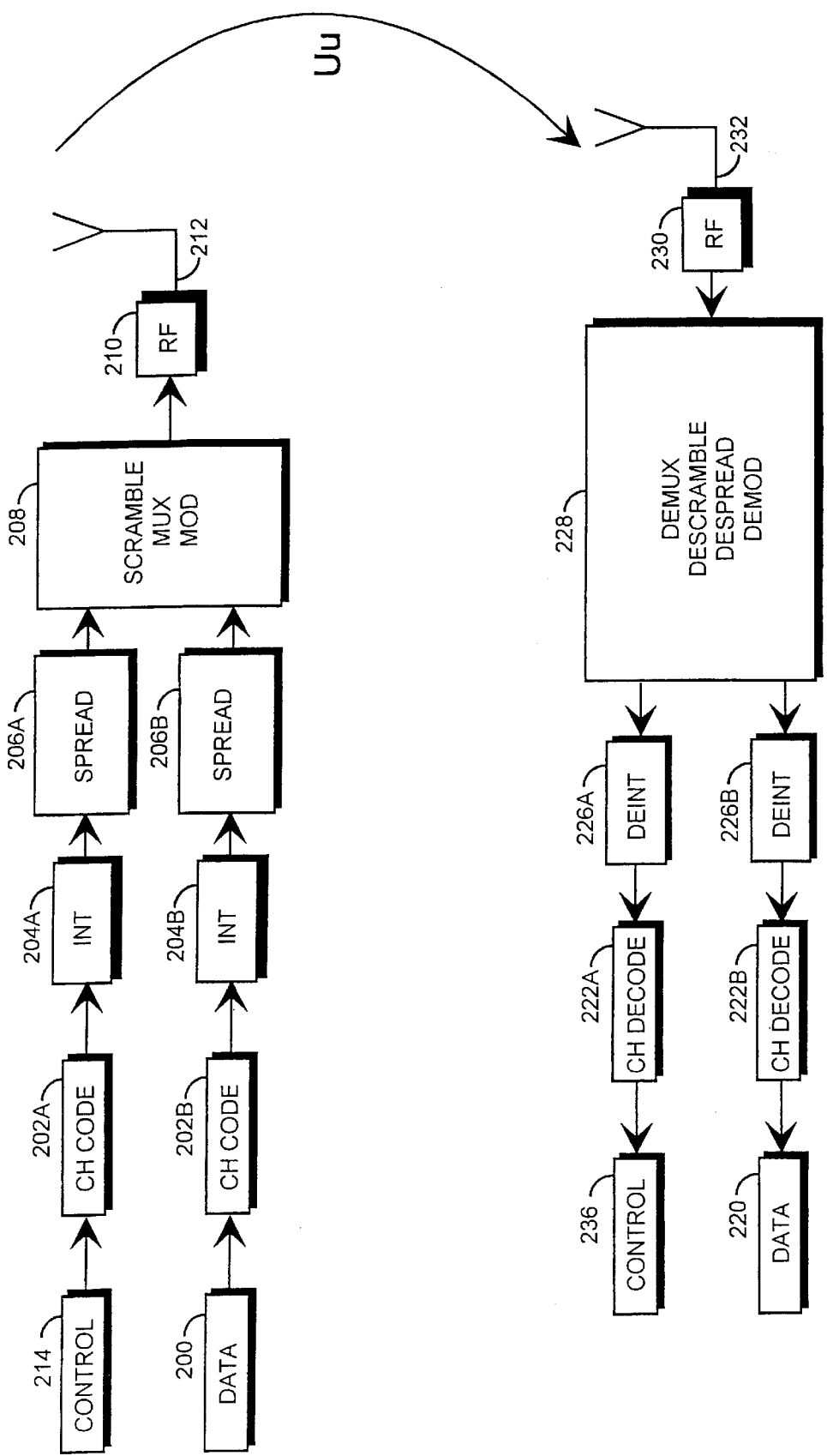
FIG. 2A shows a transmitter and receiver of the mobile telephone system, FIG. 2B describes spreading code processing performed in the transmitter and receiver.

FIG. 2A describes the operation of a radio transmitter-radio receiver pair. The radio transmitter can reside in the node B or in the user equipment UE, and the radio receiver correspondingly in the user equipment UE or the node B.

The upper part of FIG. 2A describes the essential functions of the radio transmitter. Various services located in the physical channel include speech, data, moving or still video picture, and control channels of the system. The figure shows the processing of the control channel and data. Different services require different source coding means, for instance speech requires a speech codec. For clarity's sake, source coding means are not, however, described in FIG. 2A.

Pilot bits, which the receiver uses in channel estimation, are placed in the control channel 214. User data 200 is placed in a data channel.

Different channel coding is then performed for different channels in blocks 202A and 202B. Channel coding includes, for instance, different block codes, an example of which is the cyclic redundancy check (CRC). In addition, convolution coding and its various modifications, such as punctured convolution coding or turbo coding, are typically used. Said pilot bits are, however, not channel-coded, because the purpose is to find out any distortions caused by the channel to the signal.

When the different channels have been channel-coded, they are interleaved in an interleaver 204A, 204B. The purpose of interleaving is to facilitate error correction. In interleaving, the bits of different services are mixed in a certain manner together, in which case a momentary fade in the radio path does not necessarily make the transmitted information unidentifiable. The interleaved bits are then spread with a spreading code in blocks 206A, 206B. The obtained chips are then scrambled with a scrambling code and modulated in block 208. Next, the individual signals are combined in block 208 to be transmitted through one transmitter. Combining can be time-multiplexing or IQ-multiplexing (I=in-phase, Q=quadrature), for instance.

Finally, the combined signal is forwarded to radio frequency parts 210 which can comprise different power amplifiers and filters restricting bandwidth. The closed loop control used in the power control of the transmission usually controls the transmission power control amplifier located in this block. The analogue radio signal is then transmitted through an antenna 212 to the radio path Uu.

The lower part of FIG. 2A describes the essential functions of the radio receiver. The radio receiver is typically a RAKE receiver. An analogue radio frequency signal is received from the radio path Uu with an antenna 232. The signal is forwarded to radio frequency parts 230 comprising a filter which prevents all frequencies outside the desired bandwidth.

After this, the signal is converted in block 228 to an intermediate frequency or directly to a base band, and the thus converted signal is then sampled and quantized. As the signal in question is a multi-path propagated signal, the aim is to combine the signal components that have propagated via different paths in block 228 which comprises actual RAKE fingers according to prior art. The demultiplexing of various channels, removal of the scrambling code, removal of the spreading code and demodulation is thus performed in block 228.

The interleaving of the received physical channels is then removed in deinterleaving means 226A, 226B. The channels are directed each to its own channel decoding block 222A, 222B where the channel coding, for instance block coding or convolution coding, used in transmission is decoded. Convolution coding is preferably decoded with a Viterbi decoder. Each transmitted channel 236, 220 can then be forwarded to a required further processing, for instance data 220 is forwarded to a computer 122 connected to the user equipment UE. The control channels of the system are forwarded to the control part 236 of the radio receiver.

FIG. 2B describes in greater detail the spreading of a channel with a spreading code and its modulation so that any measures described in FIG. 2A that are not essential for the spreading have been left out. In the figure, a bit stream 250A of the channel arrives from the left to the multiplier 254A which performs the spreading by multiplying the bit stream 250A by the spreading code 252A. The obtained spread channel is multiplied in a multiplier 258A by the carrier 256A for transmission. Correspondingly, in reception, the received signal is multiplied in a multiplier 256B by the carrier 256B. The spreading is removed by multiplying the received demodulated signal in a multiplier 254B by the used spreading code 252B. As a result, received bits 250B are obtained and their interleaving and coding is then removed as described in FIG. 2A.

A spreading code generator 260A, 260B is implemented by storing the spreading codes into memory or by storing a transformation matrix corresponding to each jump, or at least to each jump corresponding to a power of two, which transformation matrix indicates how each element of the initial state should be transformed to obtain the elements of the new state. On the basis of control data 262A, 262B, such as the ordinal number and code class of a spreading code, the desired spreading code 252A, 252B is retrieved from memory, or the desired spreading code is generated from a certain phase onward using a linear feedback shift register.

The required spreading code is according to the invention generated on the basis of control data 262A, 262B. The control data 262A, 262B indicate the initial state values of the linear feedback shift register and the ordinal number of the desired new state as calculated from the initial state.

Figure 3A:
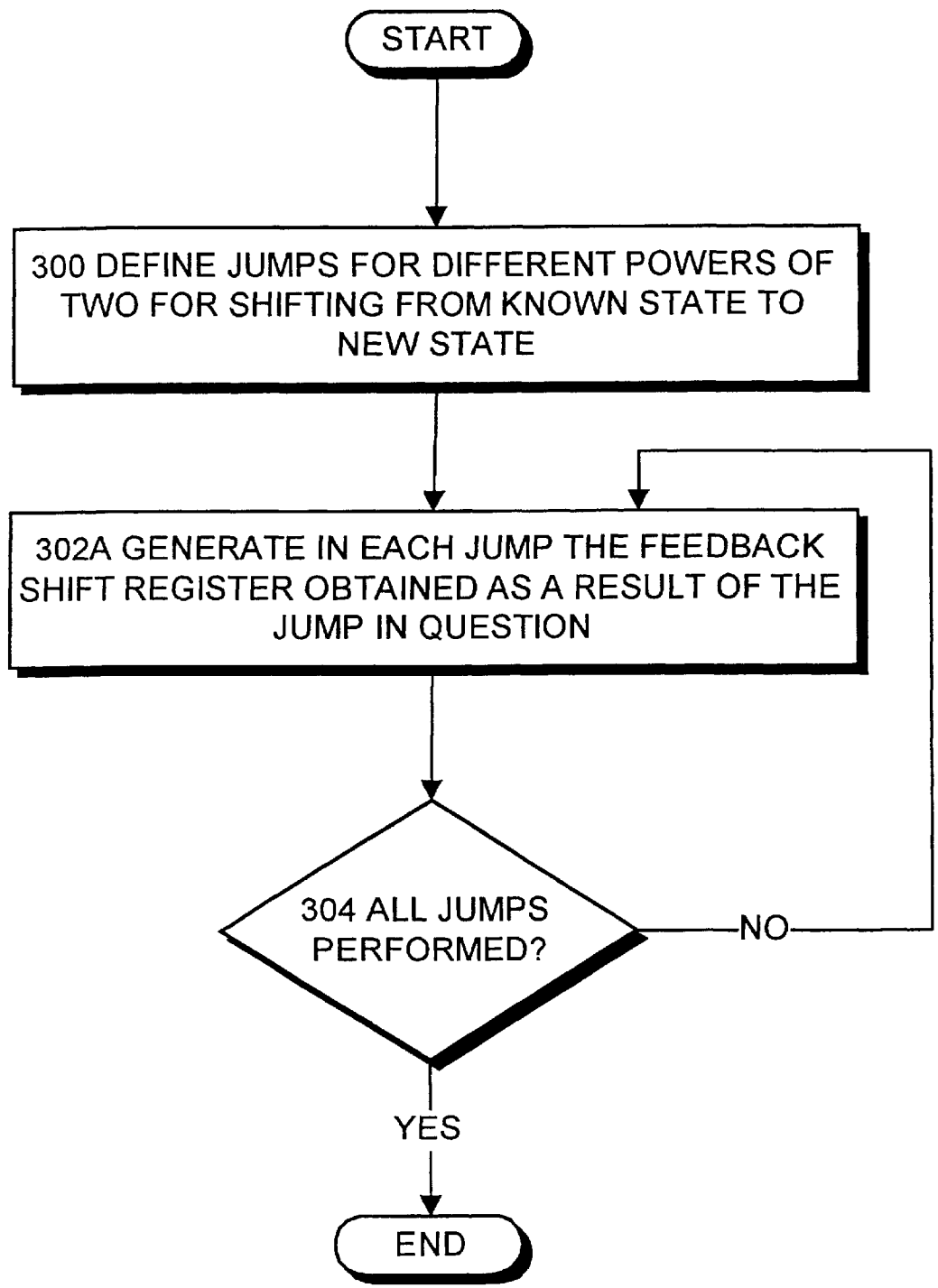
FIGS. 3A and 3B show flow charts illustrating a method for updating a linear/feedback shift register of a code generator.

FIG. 3A describes the steps in the method of the invention. The performance of the method is started from the initial block. Then in block 300, the jumps corresponding to the different powers of two are defined for shifting from the known state to a new state.

Then in block 302A, the feedback shift register which is obtained as a result of each jump is generated in each jump. The content of block 302A is described in greater detail in FIG. 3B. Block 302A also contains block 302B in which the value of one element of the obtained feedback shift register is generated from the previous state and the pre-stored mask register corresponding to said obtained element, while the mask register determines the elements of the feedback shift register of the previous state, using which elements said obtained element value is generated. Block 302A further contains block 302C in which the generation of one value in the feedback shift register for each remaining obtained feedback shift register element is repeated by shifting the mask register to the position of said remaining element and by generating the value of said remaining element of the obtained feedback shift register from the previous state and the shifted mask register.

FIGS. 4A to 4I describe the performance of the method using the linear feedback shift register described in FIG. 2C. FIG. 2C illustrates a simple feedback shift register, but it is obvious that the principles also apply to longer feedback shift registers, such as those comprising 41 elements. The feedback shift register in FIG. 2C is made up of five elements 272, 274, 276, 278, 280. Each element is connected to another in such a manner that the output of the first element 272 is connected to the input of the second element 274, the output of the second element is connected to the input of the third element 276, the output of the third element 276 is connected to the input of the fourth element 278, and the output of the fourth element 278 is connected to the input of the fifth element 280. The output 290 of the feedback shift register in question is, in fact, the output 290 of the fifth element 280. From the third element 276, there is a feedback 282 to an adder 284, and, likewise, from the fifth element 280, there is a feedback 286 to the adder 284. An XOR operation, i.e. a "logical exclusive OR", is performed in the adder 284. The truth table of the XOR operation is as follows:

| A | B | A XOR B |
|---|---|---------|
| 0 | 0 | 0 |
| 0 | 1 | 1 |
| 1 | 0 | 1 |
| 1 | 1 | 0 |

The result 288 obtained in the adder 284 by the XOR operation from the feedbacks 282, 286 is connected as the input of the first element 270.

The feedback shift register described in FIG. 2C generates an m-sequence whose length is $2^5-1=31$. Any state can be set as the initial state with the exception of the zero state, i.e. a state in which there is a zero in all elements making the content of the feedback shift register: "00000".

FIG. 4A describes the content of the feedback shift register of FIG. 2C in each 31 phase, i.e. state. At time instant 0, the initial state of the feedback shift register is "11111". At time instant 1, the state becomes "01111", employing the feedback rules described in connection with FIG. 2C. Moving from one time instant to another, the feedback shift register goes through all 31 states. At time instant 31, the feedback shift register obtains again the same state as at time instant 0, and the cycle starts anew. The feedback shift register in question could be used, for instance, to generate 31 different 5-chip spreading codes, or one long spreading code. The short spreading codes would, of course, be the consecutive values of the different elements in each state, i.e. "11111", "01111", "00111", etc. The length of the long spreading code would be 31, and it would be made up of the consecutive values 290 of the outputs of the fifth element 280 when all 31 different feedback shift register states were gone through. Thus, the long code would constitute the values of the fifth element 280 in FIG. 4A, i.e. "1111000110111010100001001011001".

FIGS. 4B to 4F describe the transformation matrices of each different jump according to prior art. FIG. 4B describes the mask register of each jump of the fifth element, FIG. 4C describes that of the fourth element, FIG. 4D that of the third element, FIG. 4E that of the second element, and FIG. 4F that of the first element. In fact, the mask register contains information on the initial state elements that affect the new state. For instance, when shifting from time instant 0 of FIG. 4A to time instant 1, the feedback shift register of FIG. 2C shows that at time instant 1, the fifth element 280 of the feedback shift register is the fourth element 278 of time instant 0, since the output of the fourth element 278 of the feedback shift register is connected to the input of the fifth element 280. The routine is continued in this manner until a mask register has been generated for all time instants.

The structures of the feedbacks of the feedback shift register must be carefully considered in generating the mask registers. The feedbacks in the feedback shift register of FIG. 2C used in the examples are from the third and the fifth states to the first state. When shifting a mask register, it is not possible to shift the value of both element 1 and 4 to element 3. Therefore, the element 3 value of a jump is generated by an XOR operation from the elements 1 and 4 of the previous jump. For instance, the value of mask register element 3 of jump 10 in FIG. 4B is generated by an XOR operation from the elements 1 and 4 of jump 9, i.e. XOR(1, 1)=0.

Figure 3B:
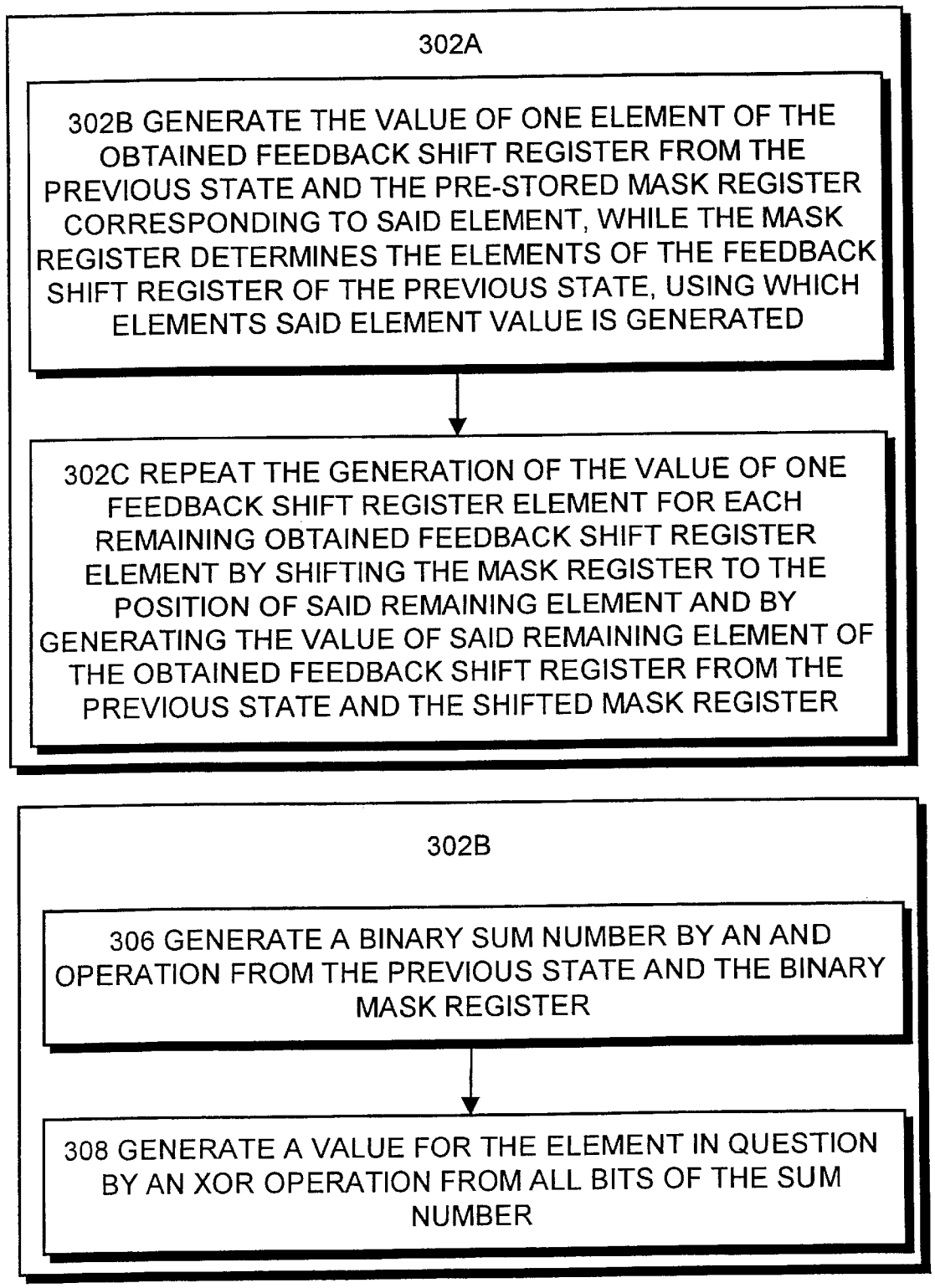

FIG. 3B describes the generation of a value of one feedback shift register element in block 302B. The value of the element is preferably generated as follows: a binary sum number is first generated in block 306 by an AND operation from the previous state and the binary mask register, i.e. in FIG. 4B "11111" AND "00010" which produces "00010" as a result, because the AND operation refers to a "logical AND" operation whose truth table is as follows:

| A | B | A AND B |
|---|---|---------|
| 0 | 0 | 0 |
| 0 | 1 | 0 |
| 1 | 0 | 0 |
| 1 | 1 | 1 |

Next in block 308, a value for the one element in question is generated by an XOR operation from all bits of the sum number, i.e. XOR(00010) is obtained for time instant 1 of the jump in FIG. 4B, which produces "1" as a result. The fact that at time instant 1 the value of the fifth element 280 is "1" can be checked from FIG. 4A.

As stated earlier, the prior art method in question of storing transformation matrices for all states requires quite a lot of memory. In the example of FIGS. 4B to 4F, the memory requirement is 31×5×5=775 bits. Even though transformation matrices for only each power of two were stored, i.e. for $2^0$, $2^1$, $2^2$, $2^3$, $2^4$, i.e. for jumps 1, 2, 4, 8, 16 of which all other jumps can be generated, 5×5×5=125 bits of memory would still be needed.

In the method of the invention described in the following, only 5×5=25 bits of memory is required for the example of FIG. 4A, since for each jump corresponding to a power of two, one mask register representing an element of the feedback shift register is stored. The stored mask register preferably represents either the least significant or the most significant bit of the feedback register, in which case the mask register only needs to be shifted in one direction. A solution where the stored mask register represents a feedback shift register element in the middle, is of course possible, but then the mask register needs to be shifted into both directions to make sure that all different elements have been gone through.

FIG. 4G describes the mask registers pre-stored for each element 1, 2, 3, 4, 5 of the jumps corresponding to the different powers of two $2^0$, $2^1$, $2^2$, $2^3$, $2^4$. For instance, for the fifth element, a mask register "00010" is stored for a jump of one time unit, "00100" for a jump of two time units, "10000" for a jump of four time units, "01101" for a jump of eight time units, and "11011" for a jump of sixteen time units.

FIG. 4H describes an example of a jump from the time instant 0 to the time instant 16 shown in FIG. 4A. At time instant 0, the initial state is "11111". By calculating the value of the fifth element in block 302B of the flow chart presented in connection with FIG. 3B, i.e. by applying the AND operation to the initial state and the mask register "11011", "11011" is obtained, from which the XOR operation produces "0".

Actions according to block 302C of FIG. 3B are performed on the other elements, i.e. the mask register is shifted to correspond to the desired element. For instance, the mask register of the fourth element has been shifted "one step to the left" in the figure, making the mask register "10011". By calculating the value of the fourth element in block 302B of the flow chart presented in connection with FIG. 3B, i.e. by applying the AND operation to the initial state and the mask register "10011", "10011" is obtained, from which the XOR operation produces "1". By repeating the described operation on the remaining elements, "0" is obtained for the value of the third element, "0" for that of the second element, and "0" for that of the first element. Thus, at time instant 16, the value of the feedback shift register is "00010", which can be validated from FIG. 4A.

FIG. 4I illustrates an update comprising several different jumps. In principle, the longest update is of the kind where all jumps corresponding to the powers of two need to be performed. In the example of FIG. 4I, the update comprises two jumps. First, a jump of four time units is performed, and then one of eight time units. The resulting feedback shift register value of "01011" at time instant 12 can be validated from FIG. 4A. The order of performance of the jumps does not affect the result as long as the sum of the jumps corresponds to the desired time instant. It should be noted with regard to FIG. 4I, that in the beginning, the previous state is the initial state, and from then on the feedback shift register obtained as a result of each previous jump.

In a preferred embodiment, the radio signal comprises an I branch and a Q branch, between which there is a certain phase deviation, and said mask register is stored on the first branch and a second mask register is stored on the second branch, the second mask register determining the feedback shift register elements of the first branch, using which the value of the element of the second branch is generated. In fact, this means that the phase deviation between the branches can be presented by a mask register. Let us assume that the phase deviation between the I and Q branches is set at 1024 chips. The mask register can then indicate which feedback shift register elements of the I phase need to be taken into account when calculating the feedback shift register elements of the corresponding Q phase. The mask register is preferably again added together with the I phase feedback shift register by an AND operation. The XOR operation described above is then performed on the obtained sum vector. The mask register shift of the invention is preferably performed only once for each element, i.e. after each shift, first the I phase element and then the Q phase element is generated, or vice versa, depending on for which branch the mask register is made.

The spreading code generator is preferably implemented as an application specific integrated circuit. It can also be implemented as conventional hardware made up of separate components. Even a purely software implementation is possible, the used processor must, however, be powerful enough to allow the calculation of the value of the chip of the spreading code during one chip, if necessary. FIG. 2B describes the parts used in a software implementation. In principle, the code generator 260A has then software 264, a processor 266 for running the software, and a memory 268 for storing the necessary mask registers. With these parts 264, 266, 268 the following means are implemented: means for defining the jumps corresponding to the different powers of two, means for generating in each jump the feedback shift register obtained as a result of the jump in question, means for generating the value of one element of the obtained feedback shift register from the previous state and the pre-stored mask register corresponding to said obtained element, and means for repeating the generation of the value of one feedback shift register element for each remaining obtained feedback shift register element by shifting the mask register to the position of said remaining element and by generating the value of said remaining element of the obtained feedback shift register from the previous state and the shifted mask register.

Even though the invention has been explained in the above with reference to examples in the accompanying drawings, it is obvious that the invention is not restricted to them but can be modified in many ways within the scope of the inventive idea disclosed in the attached claims.

What is claimed is:

1. A method for updating a linear feedback shift register of a code generator from a known state to a new state, comprising:

defining jumps for each pre-stored element in mask registers corresponding to different powers of two for shifting from a known state to a new state;

generating in each jump the feedback shift register obtained as a result of the jump as follows:

generating a value of one element of the obtained feedback shift register from a previous state and the pre-stored mask register corresponding to said element, while the mask register determines the elements of the feedback shift register of the previous state, using which elements said element value is generated; and repeating the generation of the value of one feedback shift register element for each remaining obtained feedback shift register element by shifting the mask register to a position of said remaining element and by generating the value of said remaining element of the obtained feedback shift register from the previous state and the shifted mask register.

2. A method as claimed in claim 1, wherein in the generation of the value of the element of the obtained feedback shift register:

a binary sum number is generated by an AND operation from the previous state and the binary mask register; and a value for the element in question is generated by an XOR operation from all bits of the sum number.

3. A method as claimed in claim 1, wherein one mask register representing an element of the feedback shift register is stored for each power of two.

4. A method as claimed in claim 1, wherein the stored mask register represents the least significant bit of the feedback shift register.

5. A method as claimed in claim 1, wherein the stored mask register represents the most significant bit of the feedback shift register.

6. A method as claimed in claim 1, wherein the code generated by the linear feedback shift register is a code of a radio system employing code division multiple access.

7. A method as claimed in claim 6, wherein the radio signal comprises an I branch and a Q branch, between which there is a certain phase deviation, and said mask register is stored on the first branch and a second mask register is stored on the second branch, the second mask register determining the feedback shift register elements of the first branch, using which the value of the element of the second branch is generated.

8. A code generator of a radio system, comprising:

means for defining the jumps for each pre-stored element in mask registers corresponding to the different powers of two for updating a linear feedback shift register of a code generator from a know state to a new state;

means for generating in each jump the feedback shift register obtained as a result of said jump, comprising means for generating a value of one element of the obtained feedback shift register from a previous state and the pre-stored mask register corresponding to said obtained element, while the mask register determines the elements of the feedback shift register of the previous state, using which elements said value is generated, and means for repeating the generation of the value of one feedback shift register elements for each remaining obtained feedback shift register element by shifting the mask register to a position of said remaining element and by generating the value of said remaining element of the obtained feedback shift register from the previous state and the shifted mask register.

9. A code generator as claimed in claim 8, wherein the means for generating the value of the element of the obtained feedback shift register comprise means for generating a binary sum number from the previous state and the binary mask register by an AND operation, and means for generating a value for the element in question from all bits of the sum number by an XOR operation.

10. A code generator as claimed in claim 8, wherein one mask register representing an element of the feedback shift register is stored for each power of two.

11. A code generator as claimed in claim 8, wherein the stored mask register represents the least significant bit of the feedback shift register.

12. A code generator as claimed in claim 8, wherein the stored mask register represents the most significant bit of the feedback shift register.

13. A code generator as claimed in claim 8, wherein the radio system is a system employing code division multiple access.

14. A code generator as claimed in claim 13, wherein the radio signal comprises an I branch and a Q branch, between which there is a certain phase deviation, and said mask register is stored on the first branch and a second mask register is stored on the second branch, the second mask register determining the feedback shift register elements of the first branch, using which the value of the element of the second branch is generated.

* * * * *